US012779594B2

(12) United States Patent
Zuliani

(10) Patent No.: US 12,779,594 B2
(45) Date of Patent: Nov. 3, 2026

(54) APPARATUS AND METHOD FOR MAKING SHAPED FLAT ELEMENTS

(71) Applicant: Endico S.R.L., Buja (IT)

(72) Inventor: Franco Zuliani, Buja (IT)

(73) Assignee: Endico S.R.L., Buja (IT)

( * ) Notice: Subject to any disclaimer, the term of this patent is extended or adjusted under 35 U.S.C. 154(b) by 133 days.

(21) Appl. No.: 18/833,342

(22) PCT Filed: Jan. 23, 2023

(86) PCT No.: PCT/IT2023/050018

§ 371 (c)(1),
(2) Date: Jul. 25, 2024

(87) PCT Pub. No.: WO2023/144848

PCT Pub. Date: Aug. 3, 2023

(65) Prior Publication Data

US 2025/0144745 A1 May 8, 2025

(30) Foreign Application Priority Data

Jan. 25, 2022 (IT) ........................ 102022000001223

(51) Int. Cl.
*B23K 26/38* (2014.01)
*B23K 26/08* (2014.01)
*B23K 37/02* (2006.01)

(52) U.S. Cl.
CPC .............. *B23K 26/38* (2013.01); *B23K 26/08* (2013.01); *B23K 37/02* (2013.01)

(58) Field of Classification Search
CPC ........................ B23K 37/0235; B23K 26/0838
See application file for complete search history.

(56) References Cited

U.S. PATENT DOCUMENTS 4,574,671 A 3/1986 Alessio
2014/0374393 A1* 12/2014 Battheu .............. B23K 26/0876 219/121.79
2018/0233873 A1 8/2018 Chen et al.
2019/0389011 A1* 12/2019 Miikki ................. B23K 26/402
2021/0300699 A1* 9/2021 Scheffler ................ B65H 5/224

FOREIGN PATENT DOCUMENTS

JP 2017052042 A 3/2017
WO 2012082543 A2 6/2012
WO 2023144848 A1 8/2023

OTHER PUBLICATIONS

International Search Report and Written Opinion for International PCT Application No. PCT/IT2023/050018, dated May 12, 2023.

* cited by examiner

*Primary Examiner* — Virak Nguon
(74) *Attorney, Agent, or Firm* — K&L Gates LLP

(57) ABSTRACT

Apparatus (10) for making shaped flat elements (11), comprising at least one laser head (12) mobile along at least two work axes (X, Y) which are defined by respective guide bars (13, 14) equipped with respective movement devices (15*a*, 15*b*, 16*a*, 16*b*) and configured to work said flat elements (11).

12 Claims, 2 Drawing Sheets

APPARATUS AND METHOD FOR MAKING SHAPED FLAT ELEMENTS

CROSS-REFERENCE TO RELATED APPLICATIONS

This application is a U.S. National Stage Entry under 35 U.S.C. § 371 of International Patent Application No. PCT/IT2023/050018, entitled APPARATUS AND METHOD FOR MAKING SHAPED FLAT ELEMENTS, filed Jan. 23, 2023, which claims benefit of Italian Patent Application No. 102022000001223, filed Jan. 25, 2022, the entire disclosures of which are hereby incorporated by reference herein.

FIELD OF APPLICATION

The present invention refers to an apparatus and method for making shaped flat elements, in particular starting from sheets of paper, cardboard, corrugated cardboard to perform cutting, creasing or marking operations.

BACKGROUND ART

As is known, there are apparatuses for making shaped flat elements or "plotters", consisting of a Cartesian robot with two axes that move a laser head with fixed focal length.

These plotters operate mainly in static mode, i.e., the material to be processed is placed on a fixed plane arranged in correspondence to a movement device, or plotter. The plotter works the flat element, for example cutting, marking, or other, following the geometric profile determined by the mother graphics and converted into interpolated linear movements of the motors of the apparatus. The material to be cut is static and is translated automatically or manually at the end of the working, generating a "downtime" that greatly impacts the productivity of the system.

Alternatively, there are apparatuses that provide galvanometric scanning heads associated with laser systems that use a series of mirrors that dynamically deflect the laser beam onto the material obtaining the desired cutting geometry. Basically, such galvanometric heads do not move and are fixed above the work area. The laser beam is in this case directed onto the material, even in motion, by means of mirrors contained within the galvanometric head itself. This technology has important limitations that hinder the mass diffusion of the laser solution especially for "converting" large format materials.

Specifically, the limitations of this technology are dimensional, as the galvanometric heads allow an accepted cutting quality only with work areas that on average are only a fraction of what is required by the market. The current manufacturers of laser converting machines for the reference market offer solutions with a maximum format of 1000×700 mm obtained by placing two galvanometric heads side by side, which have considerable costs.

Another limitation of the aforementioned technology is the impossibility of obtaining a perpendicularity of the cut, as the laser beam impacts the material with a variable angle up to 22°. Especially in the field of die-cutting of corrugated cardboard this is not accepted because the cut must necessarily be perpendicular to the surface of the cardboard itself.

A further limitation of the aforementioned technology is the need for considerable supply powers of the laser source because the energy focused by a scanning head is distributed over a larger area than the one focused by a head with fixed focal length.

A known cutting apparatus and cutting method are for example described in US2019/389011A. JP2017052042A and WO2012/082543A2 describe known portal type machines.

There is therefore a need to improve an apparatus and a method for making shaped flat elements that can overcome at least one of the drawbacks of the state of the art.

In particular, an object of the present invention is to obtain an apparatus for making shaped flat elements that is efficient and allows a significant increase in productivity with respect to the apparatuses known in the field.

Another object of the present invention is to obtain an apparatus for making shaped flat elements that allows working, for example cutting, marking or other, substantially without interruptions due to the loading and unloading of the materials.

A further object of the present invention is to obtain an apparatus for making shaped flat elements that allows to do the required working much faster than what happens in the apparatuses known in the field.

A further object of the present invention is to obtain an apparatus for making shaped flat elements that is lightweight and structurally stable.

Yet another object of the present invention is to obtain an apparatus for making shaped flat elements in which the quality of the workings done, for example cutting, marking or other, is much better than the one obtainable with the known apparatuses.

A further object of the present invention is to obtain an apparatus for making shaped flat elements that has low costs, for example due to the fact that galvanometric heads are not used.

A further object of the present invention is to obtain an apparatus for making shaped flat elements that has a lower environmental impact, since thanks to its efficiency and speed the power required for workings and therefore the consumption of electrical energy is drastically limited.

A further object of the present invention is to provide an efficient method for making shaped flat elements.

The Applicant has devised, tested and embodied the present invention to overcome the shortcomings of the state of the art and to obtain these and other purposes and advantages.

DISCLOSURE OF THE INVENTION

The present invention is set forth and characterized in the independent claims. The dependent claims describe other characteristics of the present invention or variants to the main inventive idea.

In accordance with the aforementioned purposes, an apparatus according to the present invention for making shaped flat elements, comprises at least one laser head with fixed focal length, mobile along at least two work axes which are defined by respective guide bars equipped with respective movement devices and configured to work said flat elements. For example, cutting, marking or other.

According to a characteristic aspect of the invention, the apparatus comprises at least one other movement device configured to support and allow the advance of said flat elements being worked in a given direction and a control unit connected at least to said movement devices, to sensors positioned on said guide bars and configured to monitor at least the deformations of said guide bars, due in particular to their movement, and to sensors configured to monitor at least the position of said flat elements in said direction.

According to another characteristic aspect of the invention, the control unit is configured to control the functioning of said movement devices at least according to the data detected by said sensors.

In particular, the control unit is configured to adjust the functioning of the movement devices of the laser head according to the deformations of the guide bars detected by the sensors positioned thereon.

Thanks in particular to the other movement device, which allows to work the flat elements in a manner defined in the jargon "On-The-Fly" and to the control unit associated with the aforementioned sensors and the movement devices, the present apparatus, which uses a laser head with fixed focal length, proves extremely efficient and allows a significant increase in productivity compared to the apparatuses known in the field.

The present apparatus also allows workings, for example cutting, marking or other, to be done substantially without interruption due to the loading and unloading of materials.

The present apparatus also allows the required workings to be done much more quickly than in the apparatuses known in the field.

The apparatus according to the invention is also lightweight, structurally stable and the quality of the workings done, for example cutting, marking or other, is significantly better than the one obtainable with the known apparatuses.

The present apparatus also has low costs, for example due to the fact that galvanometric heads are not used and has a lower environmental impact, since thanks to its efficiency and speed the power required for workings and therefore the consumption of electrical energy is drastically limited.

According to a further aspect of the invention, said control unit comprises a hardware and software system based on artificial intelligence and machine learning.

According to a further aspect of the invention, said laser head comprises a support with a reticular structure.

According to a further aspect of the invention, said support is made by means of Generative Design and Additive Manufacturing techniques.

According to a further aspect of the invention, said guide bars have a reticular structure.

According to a further aspect of the invention, said guide bars are made by means of Generative Design. Said guide bars can be manufactured by means of subtractive techniques, for example conventional milling, or by means of Additive Manufacturing, if sufficiently sized 3D printing machines are available.

According to a further aspect of the invention, said guide bars comprise zones having higher structural stresses and consequently a higher material density than other parts.

According to a further aspect of the invention, each of said guide bars comprises at least a pair of movement devices connected to said control unit.

According to a further aspect of the invention, said laser head is associated with a laser source connected to said control unit.

A further object of the invention is a method to make shaped flat elements, comprising moving at least one laser head configured to work said flat elements along at least two work axes which are defined by respective guide bars equipped with respective movement devices and moving said flat elements in a given direction by means of at least one other movement device configured to support and allow the advance of said flat elements, wherein a control unit is connected at least to said movement devices, to sensors positioned on said guide bars and configured to monitor at least the deformations of said guide bars due to their movement and to sensors configured to monitor at least the position of said flat elements in said direction.

The method in particular provides to adjust the functioning of said movement devices at least according to the data detected by said sensors.

ILLUSTRATION OF THE DRAWINGS

These and other aspects, features and advantages of the present invention will become clear from the following disclosure of embodiments, provided merely by way of non-limiting example only, with reference to the accompanying drawings in which.

It should be noted that, in the present disclosure, the phraseology and terminology used, as well as the figures in the accompanying drawings, even as disclosed, have the sole purpose of illustrating and explaining the present invention, since their function is illustrative and not limited to the invention itself, the scope of protection thereof being defined by the claims.

To facilitate understanding, identical reference numbers have been used, where possible, to identify identical common elements in the figures. It should be noted that elements and features of an embodiment can be conveniently combined or incorporated into other embodiments without further clarification.

DETAILED DESCRIPTION OF CERTAIN EMBODIMENTS

Reference will now be made in detail to the possible embodiments of the invention, one or more instances of which are shown in the attached figures by way of example only. The phraseology and terminology used herein is also for illustrative and not limiting purposes.

Figure 1:
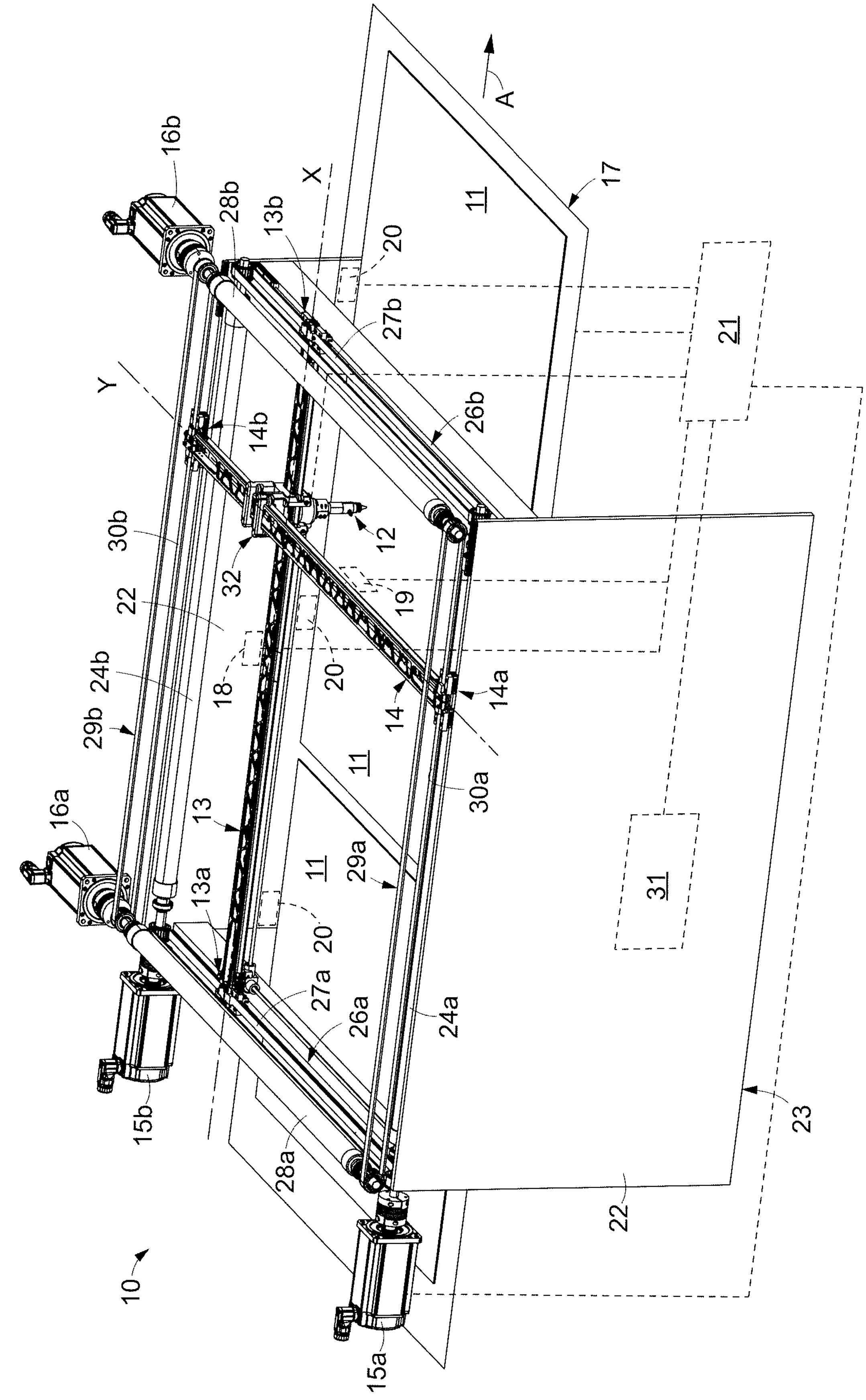
FIG. 1 is an axonometric view of an apparatus for making shaped flat elements according to the present invention.

With reference to the attached drawings, see for example FIG. 1, an apparatus 10 for making shaped flat elements 11, comprises at least one laser head 12 with fixed focal length, mobile along at least two work axes X, Y which are defined by two respective guide bars 13, 14 equipped with respective movement devices 15*a*, 15*b*, 16*a*, 16*b* and configured to work said flat elements 11.

Said apparatus 10 comprises at least one other movement device 17 configured to support and allow the advance of said flat elements 11 being worked in a given direction A and a control unit 21 connected at least to said movement devices 15*a*, 15*b*, 16*a*, 16*b*, 17, to sensors 18, 19 positioned on said guide bars 13, 14 and configured to monitor at least the deformations of said guide bars 13, 14, due in particular to their movement, and to sensors 20 configured to monitor at least the position of said flat elements 11 in said direction A.

Such a movement device 17 may for example be a conveyor belt or other.

Said sensors 18, 19 monitor in real time the deformation of the guide bars 13, 14 and then communicate it to the control unit 21, which can thus regulate, for example the speed of the movement devices 15*a*, 15*b*, 16*a*, 16*b*, according to the values received. For example, in the event that one of said guide bars 13 or 14 is subjected to excessive stress resulting in excessive deformation values, the control unit 21 can operate compensations for the trajectory of said guide bars 13, 14 so as to compensate for said deformations.

Said sensors 18, 19 can be positioned along said guide bars 13, 14 in positions suitable to allow said control unit 21 to correctly detect the deformations of said guide bars 13, 14. Then, said sensors 18, 19 can be in number and positions that are variable and predetermined as a function, for example of parameters such as the length of the guide bars 13, 14, the general dimensions of the apparatus 10, the speed and/or the acceleration of the laser head 12, or others.

The sensors 20, which detect the positioning of the transiting flat elements 11, can be housed for example on flanks 22 of a structure 23 of support of the apparatus 10 and can be in the appropriate position and number. By way of example and for the sake of clarity, it has been schematized that the control unit 21 is electrically connected to one of the sensors 20, but said control unit 21 will be connected to all the sensors 20 provided in the apparatus 10 that are assumed at the inlet, in intermediate position and at the outlet of said apparatus 10.

The control unit 21 is configured to adjust the functioning of the movement devices 15*a*, 15*b*, 16*a*, 16*b*, 17 at least as a function of the data detected by the sensors 18, 19, 20.

The control unit 21 is configured to synchronize the movement of the laser head 12 with the movement of the transiting flat elements 11 so as to obtain a precise "On-The-Fly" working.

The guide bars 13 and 14 each preferably comprise a pair of movement devices, i.e., the movement devices 15*a*, 15*b* configured to move along the axis Y the guide bar 13 directed along the axis X and the movement devices 16*a*, 16*b* configured to move along the axis X the guide bar 14 directed along the axis Y.

Considering for example the movement devices 15*a*, 15*b* of the guide bar 13, each of them is connected to a shaft 24*a*, 24*b*. Said shafts 24*a*, 24*b* are parallel and kinematically connected by means of a pair of motion transmission elements 26*a*, 26*b*, such as belts, chains or the like. On a branch 27*a*, 27*b* of said elements 26*a*, 26*b* there is provided the connection of an end 13*a*, 13*b* of the guide bar 13.

Similarly, considering the movement devices 16*a*, 16*b* of the guide bar 14, each of them is connected to a shaft 28*a*, 28*b*. Said shafts 28*a*, 28*b* are parallel and kinematically connected by means of a pair of motion transmission elements 29*a*, 29*b*, such as belts, chains or the like. On a branch 30*a*, 30*b* of said elements 29*a*, 29*b* there is provided the connection of an end 14*a*, 14*b* of the guide bar 14.

The guide bars 13 and 14 are staggered in height so that they do not interfere with each other during their translatory motion. The guide bar 13, directed along the axis X, will move in both directions along the axis Y, while the guide bar 14, directed along the axis Y, will move in both directions along the axis X.

The control unit 21 is electrically connected to each of said movement devices 15*a*, 15*b*, 16*a*, 16*b*, although for simplicity of illustration in FIG. 1 only the connection with the movement device 15*a* is shown in dash.

Said control unit 21 may provide a hardware and software system based on artificial intelligence and machine learning. The hardware and software system are configured to synchronize at least the actuation of the movement devices 15*a*, 15*b*, 16*a*, 16*b* of the guide bars 13, 14 and then ultimately of the laser head 12, with the actuation of the movement device 17 and then the translation of the flat elements 11. Such synchronization is useful to obtain a precise working of said flat elements 11 by means of said laser head 12.

Furthermore, said control unit 21 is configured to adjusts the operating parameters of said movement devices 15*a*, 15*b*, 16*a*, 16*b* as a function of the deformations of the guide bars 13, 14 detected by the sensors 18, 19, also in a predictive way.

The control unit can be configured to adjust the functioning of the movement device 17 at least as a function of the data detected by the sensors 20 and thus synchronize the operation of the movement devices 15*a*, 15*b*, 16*a*, 16*b* accordingly.

Such a hardware and software system may in particular be based on machine learning of a laser cutting process.

Figure 2:
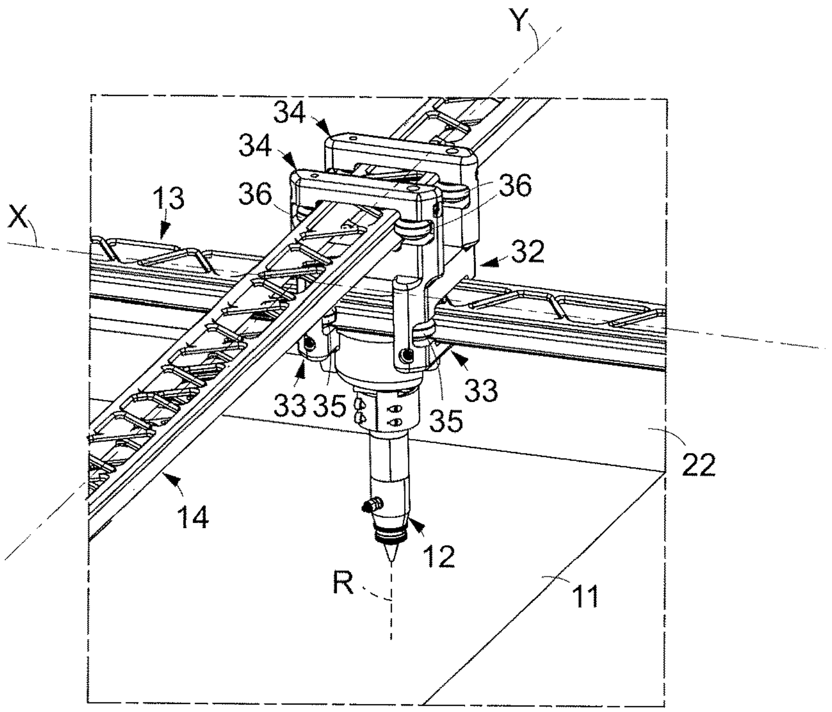
FIG. 2 is an axonometric view of a laser head of the present apparatus.

Said laser head 12, see also FIG. 2, focuses a laser beam R on a plane orthogonal to the same radius, i.e., the plane on which the flat elements 11 lie. Said laser beam R is produced by a laser source 31, see FIG. 1, which, by means of a series of lenses and mirrors, is configured to convey said laser beam R towards said laser head 12. The control unit 21 is also connected to said laser source 31, so as to properly command its operation.

Said laser head 12 comprises a support 32 provided with one or more first annular elements 33 through which the guide bar 13 passes and one or more second annular elements 34 through which the guide bar 14 passes. Preferably, said support 32 comprises at least a pair of said first annular elements 33 and at least a pair of said second annular elements 34, so as to make it more stable.

Said first annular elements 33 are staggered in height with respect to said second annular elements 34, as well as the guide bars 13, 14 by which they are crossed. Said first annular elements 33 are therefore also directed orthogonally with respect to said second annular elements 34.

On the sides of each of said first and second annular elements 33 and 34 there are provided rotating components 35 and 36, such as rolling bearings or the like. In this way, when for example the guide bar 13, directed along the axis X, moves along the axis Y, the rotating components 36 associated with said second annular elements 34 slide on the sides of the guide bar 14, which is stationary. Then, the laser head 12 moves along the axis Y. When instead the guide bar 14, directed along the axis Y, moves along the axis X, the rotating components 35 associated with said first annular elements 33 slide on the sides of the guide bar 13, which is stationary. In this case the laser head 12 moves along the axis X.

Advantageously, in order to give greater lightness to the apparatus 10, said support 32 has a reticular conformation, for example by providing said first and second annular elements 33, 34. Furthermore, said support 32 is preferably created by means of Generative Design, i.e., by means of a software that automatically creates its structure on the basis of the data entered by the designer.

The model of the support 32 may be materially created by means of Additive Manufacturing, for example 3D printing. In essence, by means of Generative Design it is possible to develop an ultra-light 3D CAD model of the parts constituting said support 32 and by means of Additive Manufacturing it is possible to produce said parts with lightweight materials, for example plastic materials or the like.

Figure 3:
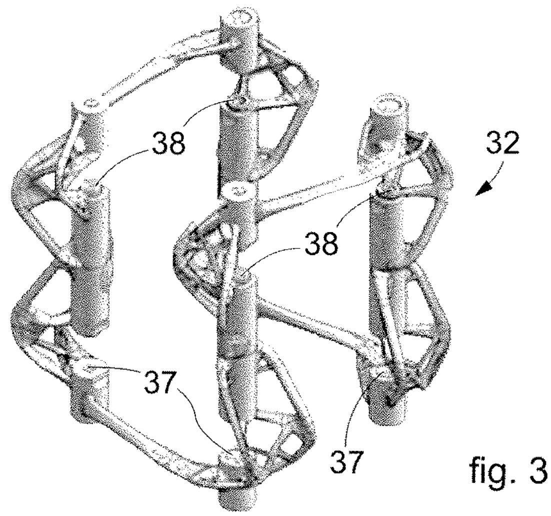
FIG. 3 is a schematic and axonometric view of part of a support of the laser head obtained by means of Generative Design.

An example of part of said support 32 created by means of Generative Design and with a reticular structure is illustrated in FIG. 3, in which the housings 37, 38 for the rotating components 35, 36 can be identified, for example.

The guide bars 13, 14 can have a reticular structure, so as to allow greater lightness to the apparatus 10. In particular, said guide bars 13, 14 can also be conceived by means of Generative Design and made by means of Additive Manufacturing.

Figure 4:
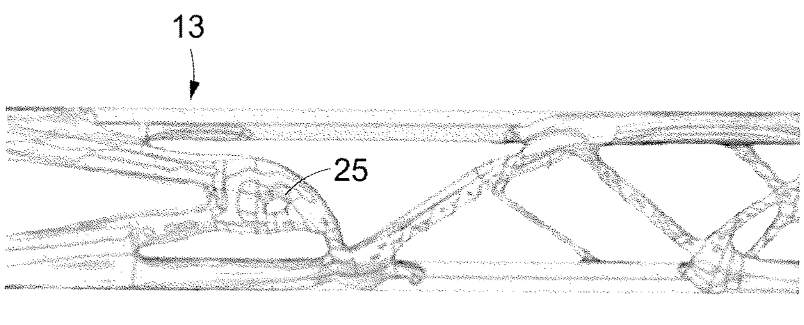
FIG. 4 is a schematic side view of part of a guide bar of the present apparatus obtained by means of Generative Design.

An example of part of a guide bar 13 (or 14) with a reticular structure and created by means of Generative Design is illustrated in FIG. 4. For example, it can be assumed that zones 25 of said guide bar 13 where the structural stresses are greater, at the nodes, have a higher material density than other parts.

The combination of Generative Design and Additive Manufacturing has allowed to drastically reduce the mass of the moving parts, such as for example the support 32 and the guide bars 13, 14, up to 80%, while maintaining the structural mechanical rigidity of the same moving parts designed with classical methods.

For example, by means of the present apparatus 10 it is possible to operate with work areas up to 2100×1300 mm, to reach speeds and accelerations of the laser head 12 up to 13 m/s and up to 15.6 G (153 $m/s^2$), to achieve an absolute precision of the movement device 17 of the shaped flat elements 11 of 0.1 mm and also to guarantee a high productivity.

As said, the deformations of the moving parts caused by the acceleration, in particular of the guide bars 13, 14 are assessed by the control unit 21 by means of the sensors 18, 19 which report the behaviour of said guide bars 13, 14 and can allow said control unit 21 to also predict and correct said deformations, through the machine learning technique, for example by decreasing the movement speed or adapting the trajectory of the laser head 12 in such a way as to obtain the desired shaped profile even with high speeds and deformations of said guide bars 13, 14, by acting on the respective movement devices 15*a*, 15*b*, 16*a*, 16*b*.

A method to make said shaped flat elements 11, comprises moving said laser head 12 configured to work said flat elements 11 along at least said two work axes X, Y which are defined by said respective guide bars 13, 14 equipped with said respective movement devices 15*a*, 15*b*, 16*a*, 16*b* and moving said flat elements 11 in said given direction A by means of said other movement device 17 configured to support and allow the advance of said flat elements 11, wherein said control unit 21 is connected at least to said movement devices 15*a*, 15*b*, 16*a*, 16*b*, 17, to said sensors 18, 19 positioned on said guide bars 13, 14 and configured to monitor at least the deformations of said guide bars 13, 14 due to their movement and to said sensors 20 configured to monitor at least the position of said flat elements 11 in said direction A.

Ultimately, with respect to the apparatuses known on the market, the present apparatus 10 allows a considerable increase in productivity in making shaped flat elements 11, since the working process does not undergo interruptions for unloading/loading the material to be processed, thanks above all to the provision of the movement device 17.

The present apparatus 10 is inherently faster thanks to the solutions adopted and described above that have allowed to reduce the moving masses by an average of 80% and of the control unit 21 capable of compensating for the residual deformations.

The working quality of the flat elements 11 is significantly better than known systems, thanks to the use of the laser head 12 which is moved as described above.

The present apparatus 10 has a lower production cost than the known systems because for the same efficiency a laser source of much lower power is used than the normally used sources and expensive galvanometric heads are not used. This allows laser technology to be made available even to manufacturers with reduced investment capacity.

Finally, the present apparatus 10 has a lower environmental impact in that the lower power required to work the flat elements 11 drastically reduces the consumption of electrical energy.

It is clear that modifications and/or additions of parts may be made to the apparatus and the method disclosed herein, without departing from the scope of the present invention as defined by the claims.

It is also clear that, although the present invention has been described with reference to some specific examples, a person skilled in the art will be able to realize other equivalent forms of apparatus and method for making shaped flat elements, having the characteristics expressed in the claims and therefore all falling within the scope of protection defined by them.

In the following claims, the references in parentheses have the sole purpose of facilitating reading and must not be considered as limiting factors of the scope of protection defined by the claims themselves.

The invention claimed is:

1. An apparatus (10) for making shaped flat elements (11), the apparatus comprising at least one laser head (12) with a fixed focal length, mobile along at least two work axes (X, Y), which are defined by respective guide bars (13, 14) equipped with respective first movement devices (15*a*, 15*b*, 16*a*, 16*b*), and configured to work said flat elements (11), wherein the apparatus further comprises at least one second movement device (17) configured to support and allow an advance of said flat elements (11) in a given direction (A), and a control unit (21) connected at least to said first and second movement devices (15*a*, 15*b*, 16*a*, 16*b*, 17), to first sensors (18, 19) positioned on said guide bars (13, 14) configured to monitor at least deformations of said guide bars (13, 14), and to second sensors (20) configured to monitor at least a position of said flat elements (11) in said direction (A), wherein said control unit (21) is configured to adjust a functioning of said first and second movement devices (15*a*, 15*b*, 16*a*, 16*b*, 17) at least according to data detected by said first and second sensors (18, 19, 20).

2. The apparatus (10) of claim 1, wherein said control unit (21) comprises a hardware and a software system based on artificial intelligence and machine learning of a laser cutting process.

3. The apparatus (10) of claim 1, wherein said laser head (12) comprises a support (32) with a reticular structure.

4. The apparatus (10) of claim 3, wherein said support (32) is made by means of Generative Design and Additive Manufacturing.

5. The apparatus (10) of claim 1, wherein said guide bars (13, 14) have a reticular structure.

6. The apparatus (10) of claim 5, wherein said guide bars (13, 14) are made by means of Generative Design.

7. The apparatus (10) of claim 6, wherein said guide bars (13, 14) comprise zones (25) having higher structural stresses and consequently a higher material density than other parts of said guide bars.

8. The apparatus (10) of claim 1, wherein each of said guide bars (13, 14) comprises at least one pair of said first movement devices (15*a*, 15*b*, 16*a*, 16*b*) connected to said control unit (21).

9. The apparatus (10) of claim 1, wherein said laser head (12) is associated with a laser source (31) connected to said control unit (21).

10. The apparatus (10) of claim 1, wherein said control unit (21) is configured to adjust the functioning of said first movement devices (15*a*, 15*b*, 16*a*, 16*b*) at least according to the deformations of said guide bars (13, 14) detected by said first sensors (18, 19).

11. The apparatus (10) of claim 1, wherein said control unit (21) is configured to adjust the functioning of said second movement device (17) at least as a function of the data detected by said second sensors (20) and to synchronise an actuation of said first movement devices (15*a*, 15*b*, 16*a*, 16*b*).

12. A method to make shaped flat elements (11), the method comprising moving at least one laser head (12) configured to work said flat elements (11) along at least two work axes (X, Y) which are defined by respective guide bars (13, 14) equipped with respective first movement devices (15*a*, 15*b*, 16*a*, 16*b*), and moving said flat elements (11) in a given direction (A) by means of at least one second movement device (17) configured to support and allow an advance of said flat elements (11), wherein a control unit (21) is connected at least to said first and second movement devices (15*a*, 15*b*, 16*a*, 16*b*, 17), to first sensors (18, 19) positioned on said guide bars (13, 14) and configured to monitor at least deformations of said guide bars (13, 14), and to second sensors (20) configured to monitor at least a position of said flat elements (11) in said direction (A), wherein said method provides to adjust a functioning of said first and second movement devices (15*a*, 15*b*, 16*a*, 16*b*, 17) at least according to data detected by said first and second sensors (18, 19, 20).

* * * * *